United States Patent
Celicourt

(10) Patent No.: US 11,252,485 B2
(45) Date of Patent: Feb. 15, 2022

(54) INTEGRATION OF TRANSDUCER DATA COLLECTION

(71) Applicant: NRG HOLDINGS, LLC, Brooklyn, NY (US)

(72) Inventor: Paul Celicourt, Brooklyn, NY (US)

(73) Assignee: NRG HOLDINGS, LLC, Brooklyn, NY (US)

( * ) Notice: Subject to any disclaimer, the term of this patent is extended or adjusted under 35 U.S.C. 154(b) by 994 days.

(21) Appl. No.: 15/362,937

(22) Filed: Nov. 29, 2016

(65) Prior Publication Data

US 2018/0152826 A1     May 31, 2018

(51) Int. Cl.
*H04Q 9/00*     (2006.01)
*H04W 4/029*     (2018.01)
*H04W 4/02*     (2018.01)

(52) U.S. Cl.
CPC .............. *H04Q 9/00* (2013.01); *H04W 4/029* (2018.02); *H04W 4/02* (2013.01)

(58) Field of Classification Search
CPC . H04L 67/12; H04L 67/2804; H04L 12/2816; H04Q 9/00; H04W 4/04; H04W 4/38; H04W 84/18
See application file for complete search history.

(56) References Cited

U.S. PATENT DOCUMENTS

| 6,553,336 | B1 * | 4/2003 | Johnson | G01D 3/022 |
| | | | | 702/188 |
| 7,734,590 | B2 | 6/2010 | Chand et al. | |
| 8,082,115 | B2 | 12/2011 | Bechhoefer et al. | |
| 9,472,029 | B2 | 10/2016 | Plante | |
| 2004/0088374 | A1 * | 5/2004 | Webb | G06F 19/3418 |
| | | | | 709/218 |
| 2007/0067360 | A1 * | 3/2007 | Engel | H04L 43/12 |
| 2007/0078527 | A1 * | 4/2007 | Gonzalez-Banos | G16H 40/40 |
| | | | | 700/19 |
| 2010/0185085 | A1 * | 7/2010 | Hamilton | A61B 8/0858 |
| | | | | 600/437 |

(Continued)

FOREIGN PATENT DOCUMENTS

WO     2017015392 A1     1/2017

OTHER PUBLICATIONS

International Search Report for corresponding International Application No. US2017/058765 dated Jan. 9, 2018 (3 pages).

*Primary Examiner* — Aaron N Strange
(74) *Attorney, Agent, or Firm* — Carter, DeLuca & Farrell LLP; Bret P. Shapiro; George Likourezos

(57) ABSTRACT

A base station may include a transceiver, a memory and a processor. The processor is effective to identify first and second raw data collectable by first and second transducer devices. The processor may generate first and second metadata associated with the first and second transducer devices, respectively. The processor may send the first and second metadata to the first and second transducer devices The processor may receive the first raw data and the first metadata from the first transducer device, the second raw data and the second metadata from the second transducer device. The processor may transform the first raw data into first transducer data based on the first metadata and transform the second raw data into second transducer data based on the second metadata, wherein the second transducer data corresponds to the second format.

20 Claims, 4 Drawing Sheets

(56) References Cited

U.S. PATENT DOCUMENTS

| | | | |
|---|---|---|---|
| 2010/0235132 A1* | 9/2010 | Havens | G01D 9/00 702/116 |
| 2012/0089708 A1* | 4/2012 | Kim | H04L 67/34 709/220 |
| 2012/0163520 A1* | 6/2012 | Liu | G01S 5/0018 375/356 |
| 2012/0197898 A1* | 8/2012 | Pandey | G06F 16/2264 707/741 |
| 2013/0254416 A1* | 9/2013 | Abraham | G06F 16/285 709/230 |
| 2015/0046532 A1* | 2/2015 | Szczytowski | G06F 11/3086 709/204 |
| 2015/0080044 A1* | 3/2015 | McHenry | H04W 16/14 455/515 |
| 2015/0249588 A1* | 9/2015 | Leon | G06F 9/4416 709/204 |
| 2015/0379853 A1* | 12/2015 | Gallo | H04W 4/12 340/600 |
| 2016/0006815 A1* | 1/2016 | Dong | G06F 9/46 709/204 |
| 2016/0100273 A1* | 4/2016 | Boran | H04W 4/70 702/188 |
| 2016/0147962 A1* | 5/2016 | Vollmar | G16H 50/20 705/2 |
| 2016/0205106 A1* | 7/2016 | Yacoub | H04L 61/3025 726/28 |
| 2018/0152826 A1* | 5/2018 | Celicourt | H04W 4/029 |

\* cited by examiner

INTEGRATION OF TRANSDUCER DATA COLLECTION

BACKGROUND

Unless otherwise indicated herein, the materials described in this section are not prior art to the claims in this application and are not admitted to be prior art by inclusion in this section.

One or more transducers may be deployed to one or more locations to collect environmental data. In some examples, a first transducer may be deployed to the location to measure a first attribute of the surroundings of the location, and a second transducer may be deployed to the location to measure a second attribute of the surroundings of the location. In some examples, the first and second transducers may be deployed to the location to measure a same attribute of the surroundings of the location.

SUMMARY

One embodiment of the invention is a method for generating a report relating to transducer data. The method may comprise identifying first raw data collectable by a first transducer device. The method may comprise generating, by a base station, first metadata associated with the first transducer device, wherein the first metadata corresponds to the first raw data, and the first metadata is effective to indicate a first format of a first parameter of the first raw data. The method may comprise sending, by the base station, the first metadata to the first transducer device. The method may comprise identifying second raw data collectable by a second transducer device. The method may comprise generating, by the base station, second metadata associated with the second transducer device, wherein the second metadata corresponds to the second raw data, and the second metadata is effective to indicate a second format of a second parameter of the second raw data. The method may comprise sending, by the base station, the second metadata to the second transducer device. The method may comprise receiving, by the base station, the first raw data and the first metadata from the first transducer device, wherein the first raw data corresponds to the first format. The method may comprise receiving, by the base station, the second raw data and the second metadata from the second transducer device, wherein the second raw data corresponds to the second format. The method may comprise in response to receiving the first raw data and the first metadata, transforming, by the base station, the first raw data into first transducer data based on the first metadata, wherein the first transducer data corresponds to the first format. The method may comprise in response to receiving the second raw data and the second metadata, transforming, by the base station, the second raw data into second transducer data based on the second metadata, wherein the second transducer data corresponds to the second format. The method may comprise publishing the first and second transducer data on a network.

Another embodiment of the invention includes a method for measuring transducer data. The method may comprise sending, by a first transducer device to a base station, a first identification of first raw data collectable by a first transducer device. The method may comprise receiving, by the first transducer device from the base station, first metadata associated with the first transducer device, wherein the first metadata corresponds to the first raw data. The first metadata may be effective to indicate a first format of a first parameter of the first raw data. The method may comprise sending, by a second transducer device to the base station a second identification of second raw data collectable by a second transducer device. The method may comprise receiving, by the second transducer device from the base station, second metadata associated with the second transducer device, wherein the second metadata corresponds to the second raw data. The second metadata may be effective to indicate a second format of a second parameter of the second raw data. The method may comprise sending, from the first transducer device to the base station, the first raw data and the first metadata, wherein the first raw data corresponds to the first format. The method may comprise sending, by the second transducer device to the base station, the second raw data and the second metadata, wherein the second raw data corresponds to the first format. The method may comprise, in response to receiving the first raw data and the first metadata, transforming, by the base station, the first raw data into first transducer data based on the first metadata, wherein the first transducer data corresponds to the first format. The method may comprise, in response to receiving the second raw data and the second metadata, transforming, by the base station, the second raw data into second transducer data based on the second metadata, wherein the second transducer data corresponds to the second format. The method may comprise publishing the first and second transducer data on a network.

Another embodiment of the invention is device effective to generate a report relating to transducer data. The device may comprise a transceiver, a memory, and a processor. The processor may be effective to be in communication with the transceiver and the memory. The processor may be effective to identify first raw data collectable by a first transducer device. The processor may be effective to store a first association of the first raw data and the first transducer device in the memory. The processor may be effective to generate first metadata associated with the first transducer device, wherein the first metadata corresponds to the first raw data. The first metadata may be effective to indicate a first format of a first parameter of the first raw data. The first metadata may be effective to send, through the transceiver, the first metadata to the first transducer device. The first metadata may be effective to identify second raw data collectable by a second transducer device. The first metadata may be effective to store a second association of the second raw data and the second transducer device in the memory. The first metadata may be effective to generate second metadata associated with the second transducer device, wherein the second metadata corresponds to the second raw data. The second metadata may be effective to indicate a second format of a second parameter of the second raw data. The first metadata may be effective to send, through the transceiver, the second metadata to the second transducer device. The transceiver may be effective to receive the first raw data and the first metadata from the first transducer device, wherein the first raw data corresponds to the first format. The transceiver may be effective to receive the second raw data and the second metadata from the second transducer device, wherein the second raw data corresponds to the second format. The processor may be effective to, in response to receipt of the first raw data and the first metadata, transform the first raw data into first transducer data based on the first metadata, wherein the first transducer data corresponds to the first format. The processor may be effective to, in response to receipt of the second raw data and the second metadata, transform the second raw data into second transducer data based on the second metadata, wherein the second transducer data corresponds to the second format. The processor may be effective to publish the first and second transducer data on a network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
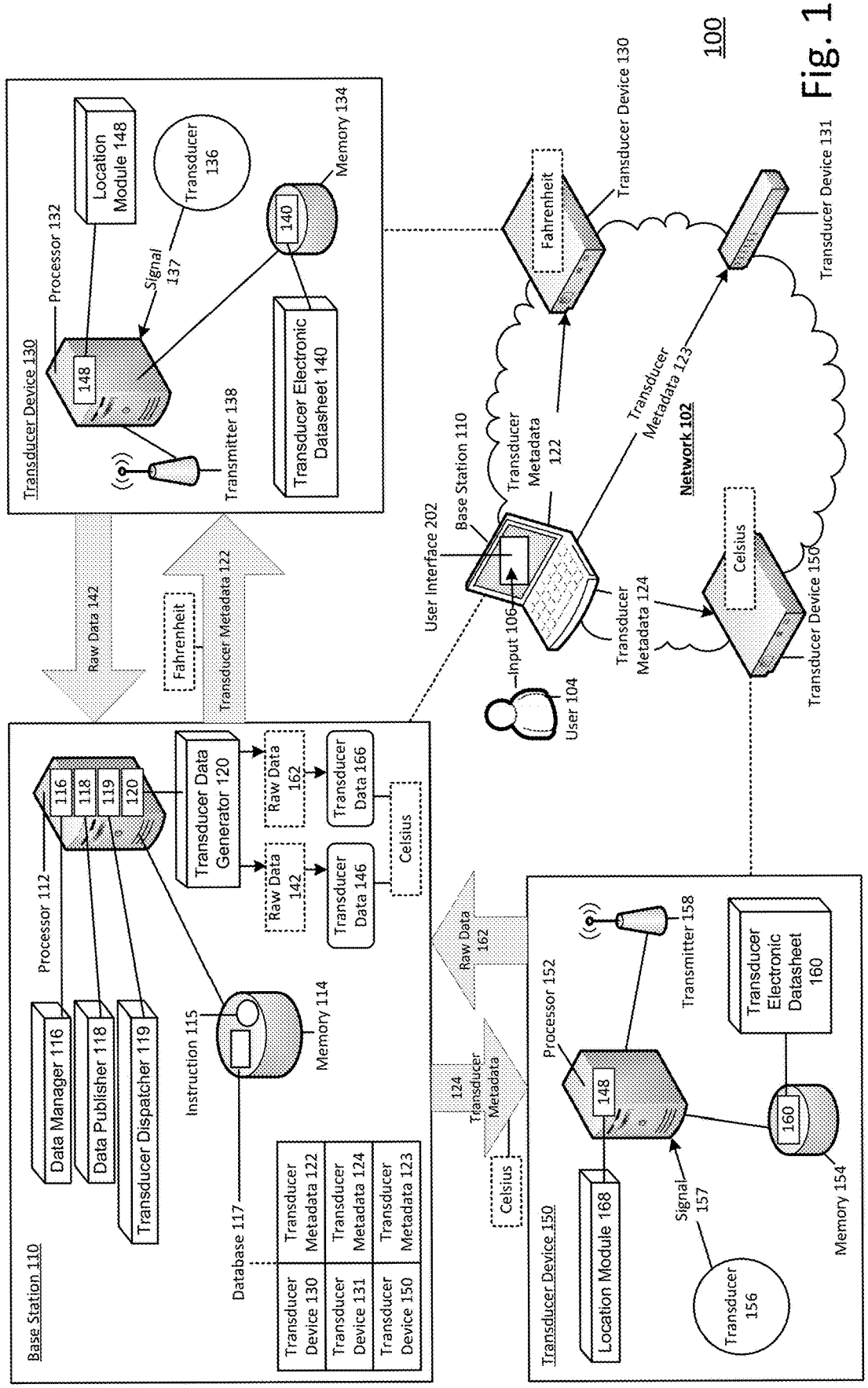
FIG. 1 illustrates an example system that can be utilized to implement a transducer data generator.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates an example system 100 that can be utilized to implement an integration of transducer data collection, arranged in accordance with at least some embodiments described herein. System 100 may include a base station 110 and/or one or more transducer devices, such as a transducer device 130, a transducer device 131, and a transducer device 150. Base station 110 and transducer devices 130, 131, 150 may be configured to be in communication with each other through a network 102. Network 102 may be the Internet, a cellular network, a personal area network, a local area network, a wide area network, etc. In some examples, each transducer device may include one or more respective transducers such as a sensor, or an actuator, etc. System 100 may include same or different types of transducer devices. For example, transducer devices 130, 150 may each include a temperature sensor, and transducer device 131 may include a humidity sensor.

Base station 110 may include a processor 112 and/or a memory 114, configured to be in communication with each other. In some examples, base station 110 may include a computing device such as a desktop computer, a laptop computer, etc., such that processor 112 may be a processor of the computing device. Processor 112 may include a data manager 116, a data publisher 118, a transducer dispatcher 119, a transducer data generator 120, and/or a data quality assurance tool 117 configured to be in communication with each other. Memory 114 may be configured to store instruction 115 and/or a database 113. Instruction 115 may include instructions relating to operations of base station 110 and transducer devices 130, 131, 150. Database 113 may be effective to store associations between transducer devices 130, 131, 150, and transducer metadata 122, 123, 124 (described below), where transducer metadata 122, 123, 124 may include metadata of data and/or measurements to be collected by a respective type of transducer device. For example, transducer metadata 122, 124 may include the type of data (e.g., temperature, humidity, etc.), the frequency of data collection, the units of measurements, etc. In another example, transducer metadata 123 may include may include the type of data (e.g., temperature, humidity, etc.), the frequency of data collection, the units of measurements, etc. In some examples, transducer metadata 122, 123, 124 may further include information relating to respective transducers such as identification of respective transducers, model numbers, serial numbers, measurement range, calibration information, manufacturer-related information, etc. In some examples, transducer metadata 122, 123, 124 may further include information for a processor, a measurement instrument, or a control system, that are configured to be in communication with a respective type of transducer.

Processor 112 may comprise various executable modules such as a data manager 116, data quality assurance tool 117, a data publisher 118, a transducer dispatcher 119, and a transducer data generator 120 that may be hardware components of the processor in some examples or may reside in memory in other examples. Transducer data generator 120 may be configured to generate transducer metadata 122, 123, 124 based on an input 106 provided by a user 104 of base station 110 (described below). Transducer data generator 120 may be further configured to generate transducer data 146, 166 (further described below) associated with transducer devices 130, 150, respectively. Generation of transducer data 146, 166 may be based on transducer metadata 122, 123, 124 and transducer raw data 142, 162, where transducer metadata 122, 123, 124 and transducer raw data 142, 162 may be received from transducer devices 130, 150, respectively. Data manager 116 may be configured to process, manage, and/or store transducer data 146, 166. Data publisher 118 may be configured to publish transducer data 146, 166 in one or more formats (e.g., JSON, XML, Excel, CSV, HTML, YAML, etc.), such as by uploading transducer data 146, 166 to network 102 to be made available through Application Programming Interfaces (APIs) in order for devices connected to network 102 to retrieve transducer data 146, 166. Devices connected to network 102 can retrieve transducer data 146, 166 online or offline through a GUI that also supports data analytics. Transducer dispatcher 119 may be configured to identify one or more transducer devices that are suitable to fulfill the request indicated by input 106, send transducer metadata 122 to suitable transducer devices 130, 150, and send input 106 to transducer devices 130, 150 for display advising that transducer devices 130, 150 be deployed to location 210. Transducer dispatcher 119 may further be configured to initiate an authentication process, receive location data 212 from location modules 148, 168 of transducer devices 130, 150 upon deployment of transducer devices 130, 150 at location 210, store location data 212 in memory 114, and determine that transducer devices 130, 150 are deployed to location 210. Data quality assurance tool 117 may search database 113 for the collected transducer raw data 142, 162 to perform a quality control operation. A quality control operation may include, but is not limited to, a check for whether there are missing values or a check for whether the minimum and maximum values of transducer 136 are within the appropriate range indicated by the respective metadata for transducer 136. Transducer metadata 122 that corresponds to the original values includes a status flag that indicates quality. Data quality assurance tool 117 corrects the values (e.g., by filling in missing data) and saves the quality controlled transducer data into database 113, such that both the original and quality controlled values are made available through a user interface (discussed herein). Data quality assurance tool 117 also updates the metadata that corresponds to the original values to reflect the state of the quality controlled values. Thus, transducer data in database 113 includes both original and quality controlled values associated with the appropriate metadata.

Transducer device 130 may include a processor 132, a memory 134, one or more of a transducer 136, a transceiver 138, a transducer electronic datasheet 140 and/or a location module 148, configured to be in communication with each other. In some examples, location module 148 may be a global positioning system (GPS) device. Transducer device 130 may be capable of retrieving the location information from location module 148 and generate transducer electronic datasheet 140 corresponding to the location information when transducer device 103 receives the corresponding command. Transducer electronic datasheet 140 may be a memory unit, such as an electrically erasable programmable read-only memory (EEPROM), configured to store transducer data 146. In some examples, memory 134 may be an EEPROM, and transducer electronic datasheet 140 may be embedded in memory 134. In some examples, transducer electronic datasheet 140 may be a data file stored in memory 134.

Transducer 136 may be an analog sensor, a digital sensor, an actuator, a transistor, etc., each having respective transducer metadata 122. Transducer 136 may be effective to generate a signal 137 in response to a stimulus associated with transducer 136. For example, when transducer 136 is a temperature sensor, transducer 136 may generate a signal 137 in response to an exposure to temperature such as air temperature, water temperature, soil temperature etc. Transducer 136 may be configured to send signal 137 to processor 132. In examples where transducer 136 may be an analog sensor, signal 137 may be an analog signal, and transducer device 130 may include an analog-to-digital converter configured to convert signal 137 into a digital signal in order to generate transducer raw data 142. In examples where transducer 136 may be a digital sensor, signal 137 may be a digital signal, and processor 132 may generate transducer raw data 142 in response to receipt of signal 137 without utilizing an analog-to-digital converter to convert signal 137 into digital format. Processor 132 may generate transducer raw data 142 based on signal 137 (described below) and may control transceiver 138 to transmit transducer raw data 142 to base station 110. In some examples, transducer raw data 142 may include one or more numbers and/or letters.

Similarly, transducer device 150 may include a processor 152, a memory 154, a transducer 156, a transceiver 158, one or more transducer electronic datasheet 160, and/or a location module 168, configured to be in communication with each other. In some examples, location module 148 may be a GPS device. Transducer electronic datasheet 160 may be a memory unit, such as an EEPROM, configured to store transducer data 166. In some examples, memory 154 may be an EEPROM, and transducer electronic datasheet 160 may be embedded in memory 154. In some examples, transducer electronic datasheet 160 may be a data file stored in memory 154.

Transducer 156 may be an analog sensor, a digital sensor, an actuator, a transistor, etc., each having respective transducer metadata 122. Transducer 156 may be effective to generate a signal 157 in response to a stimulus associated with transducer 156. Transducer 156 may send signal 157 to processor 152. In examples where transducer 156 may be an analog sensor, signal 157 may be an analog signal, and transducer device 150 may include an analog-to-digital converter configured to convert signal 157 into a digital signal in order to generate transducer raw data 162. In examples where transducer 156 may be a digital sensor, signal 157 may be a digital signal, and processor 152 may generate transducer raw data 162 in response to receipt of signal 157 without utilizing an analog-to-digital converter to convert signal 157 into digital format. Processor 152 may generate transducer raw data 162 based on signal 157 (described below) and may control transceiver 158 to transmit transducer raw data 162 to base station 110.

As will be described in more detail below, transducer dispatcher 119 of base station 110 may generate transducer metadata 122, 123, 124 for each transducer device in system 100. In an example, transducer dispatcher 119 may send transducer metadata 122 to transducer devices 130, may send transducer metadata 123 to transducer device 150, and may send transducer metadata 124 to transducer device 131. Transducer device 130 may receive transducer metadata 122 and, in response, may store transducer metadata 122 in memory 134. In some examples, transducer device 130 may generate and/or update transducer electronic datasheet 140 based on transducer metadata 122. Transducer device 150 may receive transducer metadata 124 and, in response, may store transducer metadata 124 in memory 154. In some examples, transducer device 150 may generate and/or update transducer electronic datasheet 160 based on transducer metadata 124. Transducer metadata 122, 124 may be sent to transducer devices 130, 150 before or after transducer devices 130, 150 may be deployed to one or more locations in order to collect data and/or measurements, from the one or more locations, to generate transducer raw data 142, 162. Transducer devices 130, 150 may send transducer raw data 142, 162 and/or transducer metadata 122, 124 to transducer data generator 120. Transducer data generator 120 may search database for entry containing transducer device 130, 150 and select corresponding transducer metadata 122, 124, respectively. Transducer data generator 120 may combine transducer raw data 142, 162 transducer data 146, 166 with transducer metadata 122, 124 to produce transducer data 146, 166 in memory 114, such that transducer data 146, 166 is data of uniform type, format, unit of measurement, etc. In some examples, transducer devices 130, 150 may generate their own respective metadata.

Figure 2:
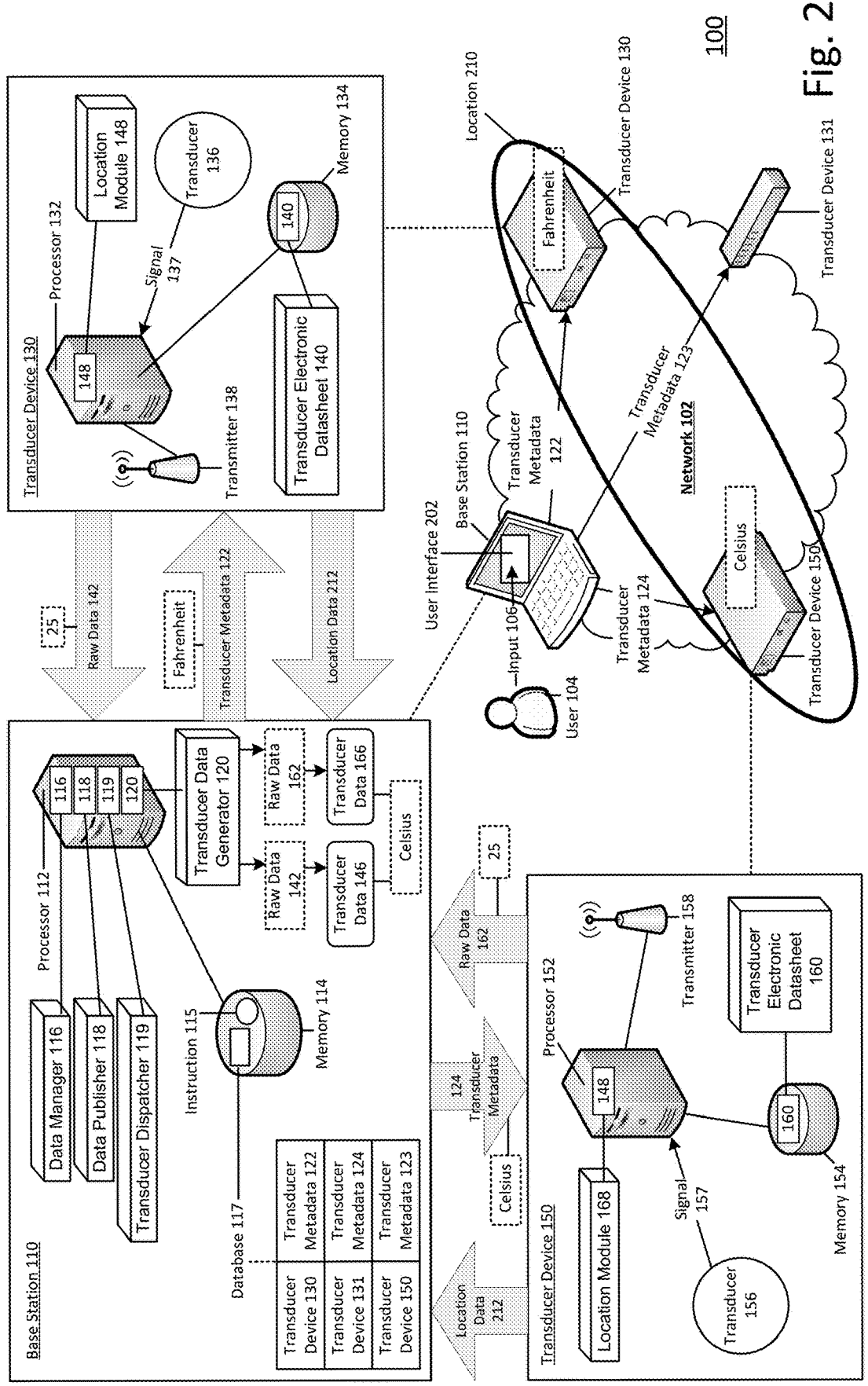
FIG. 2 illustrates the example system of FIG. 1 with additional detail relating to generation of transducer data.

FIG. 2 illustrates example system 100 of FIG. 1 with additional detail relating to generation of transducer data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In an example, a user 104 of base station 110 may use a user interface 202 to provide input 106 to transducer dispatcher 119. User 104 may provide input 106 to transducer dispatcher 119 such as by using a keyboard, a computer mouse, a microphone to generate speech commands, or a touchscreen if base station 110 includes a touchscreen device, etc. Input 106 may include instructions and/or commands relating to a request to collect one or more particular types of data.

For example, input 106 may indicate a request to collect data relating to air temperature and soil temperature at a location 210. Transducer dispatcher 119 may receive input 106 and in response, may analyze input 106. Based on the analysis of input 106, transducer dispatcher 119 may identify one or more transducer devices that may fulfill the request indicated by input 106. In the example, transducer dispatcher 119 may identify transducer devices 130, 150. In some examples, memory 114 may store a list of identifiers of transducer devices, including identifiers of transducer devices 130, 131, 150, such that transducer dispatcher 119 may search and identify transducer devices that may fulfill the request indicated by input 106. Transducer metadata may or may not be generated by the base station and/or loaded to the transducer device. In some examples, in response to identifying transducer devices 130, 150, transducer dispatcher 119 may send transducer metadata 122 to transducer device 130 and may send transducer metadata 124 to transducer device 150. In some examples, transducer dispatcher 119 may send transducer metadata 122, 124 prior to deployment to transducer device 130, 150, respectively. Transducer devices 130, 150 may receive transducer metadata 122, 124 and, in response, may store transducer metadata 122, 124 in memory 134, 154, respectively. In some examples, transducer metadata 122 may be generated by a user using a user interface on a device connected to transducer device via network. In some examples, transducer metadata 122 may be generated by a user using a user interface on base station 110 and stored with identifiers corresponding to the respective transducer devices 130, 150.

Transducer metadata 122 may include the type of data (e.g., temperature, humidity, etc.), the frequency of data collection, the units of measurements, etc. In the example shown in FIG. 2, transducer metadata 122 may include metadata effective to indicate that data and/or measurements collected by transducer 136 may be in a temperature format of Fahrenheit. Similarly, transducer metadata 124 may include metadata of data and/or measurements to be collected by transducer 156 of transducer device 150. Transducer metadata 124 may include metadata effective to indicate that data and/or measurements collected by transducer 156 may be in a temperature format of Celsius. In some examples, transducer devices 130, 150 may store transducer metadata 122, 124 in transducer electronic datasheet 140, 160, and/or in memory 134, 154, respectively. In some examples, in response to sending transducer metadata 122, 124 to transducer devices 130, 150, transducer dispatcher 119 may output a notification in user interface 202 to notify user 104 that transducer devices 130, 150 have been identified. After transducer metadata 122, 124 are sent to transducer devices 130, 150, transducer devices 130, 150 may be deployed to location 210. In some examples, user 104 may use user interface 202 to provide input 106 to deploy transducer devices 130, 150 to location 210.

Upon deployment of transducer devices 130, 150 at location 210, transducer dispatcher 119 and/or transducer devices 130, 150 may initiate an authentication process (the authentication process will be further described below) such that transducer dispatcher 119 may authenticate transducer devices 130, 150. In response to authenticating transducer devices 130, 150, transducer devices 130, 150 may collect data and/or measurements to generate transducer raw data 142, 162, respectively. In the example, transducer 130 may be deployed in an environment at location 210 such that transducer 136 may measure an air temperature at location 210. In the example, transducer 150 may be deployed in soil at location 210 such that transducer 136 may measure a soil temperature at location 210. In some examples, location modules 148, 168 may be configured to retrieve location data 212, such as GPS coordinates, of location 210, and may send location data 212 to transducer dispatcher 119.

Transducer dispatcher 119 of base station 110 may generate a command message 340 to obtain location data 212 of a transducer device 130. Transducer dispatcher 119 of base station 110 may generate command message 340 to obtain the number of transducers of a transducer device 130. In response to receiving command message 340, transducer dispatcher 119 may decode the responses and identify respective transducer devices based on the responses. Identification of transducer devices may be used by other components (e.g., data manager 116) when formulating command messages for transducer devices generally and/or particular transducers of a transducer device. For example, if transducer device responds to command message of transducer dispatcher that transducer device comprises five transducers, then transducer dispatcher 119 will generate five distinct commands requesting the same description for each transducer.

Transducer dispatcher 119 may receive location data 212 and may store location data 212 in memory 114 such that transducer dispatcher 119 may determine that transducer devices 130, 150 are deployed to location 210.

Transducer devices 130, 150 may send transducer raw data 142, 162 and/or transducer metadata 122, 124 to data manager 116, respectively. In the example shown in FIG. 2 transducer raw data 142 may include "78" and transducer raw data 162 may include "25". Data manager 116 may receive transducer raw data 142 and transducer metadata 122 from transducer device 130 and in response, may transform transducer raw data 142 into transducer data 146 based on transducer metadata 122. For example, data manager 116 may receive transducer raw data 142 and transducer metadata 122 and, in response, may identify the temperature format of "Fahrenheit" in transducer metadata 122. In response to identifying the temperature format of "Fahrenheit", data manager 116 may annotate transducer raw data 142 ("78") with transducer metadata 122 ("Fahrenheit"). As a result of the annotation, data manager 116 may determine that transducer raw data 142 ("78") may be a numeral in the temperature format "Fahrenheit". Data manager 116 may analyze input 106 provided by user 104 to identify a desired temperature format indicated in input 106. In the example, input 106 may indicate a desired temperature format of "Celsius". Data manager 116 may identify the desired temperature input and, in response, may transform transducer raw data 142 ("78") into transducer data 146 of "25.56 degree Celsius".

Similarly, data manager 116 may receive transducer raw data 162 and transducer metadata 124 and, in response, may identify the temperature format of "Celsius" in transducer metadata 124. In response to identifying the temperature format of "Celsius", data manager 116 may determine that transducer raw data 162 is already in the desired temperature format indicated by input 106. Data manager 116 may annotate transducer raw data 162 ("25") with transducer metadata 124 ("Celsius"). As a result of the annotation, data manager 116 may generate transducer data 166, where transducer data 166 may be "25 degrees Celsius". The annotation may take the form of a tabular format that relates raw data with related metadata. For example the formatting may be raw data|units|location|methods, etc.→25|degree|Celsius|latitude|longitude|raw data collected using sensor X, etc.

Figure 3:
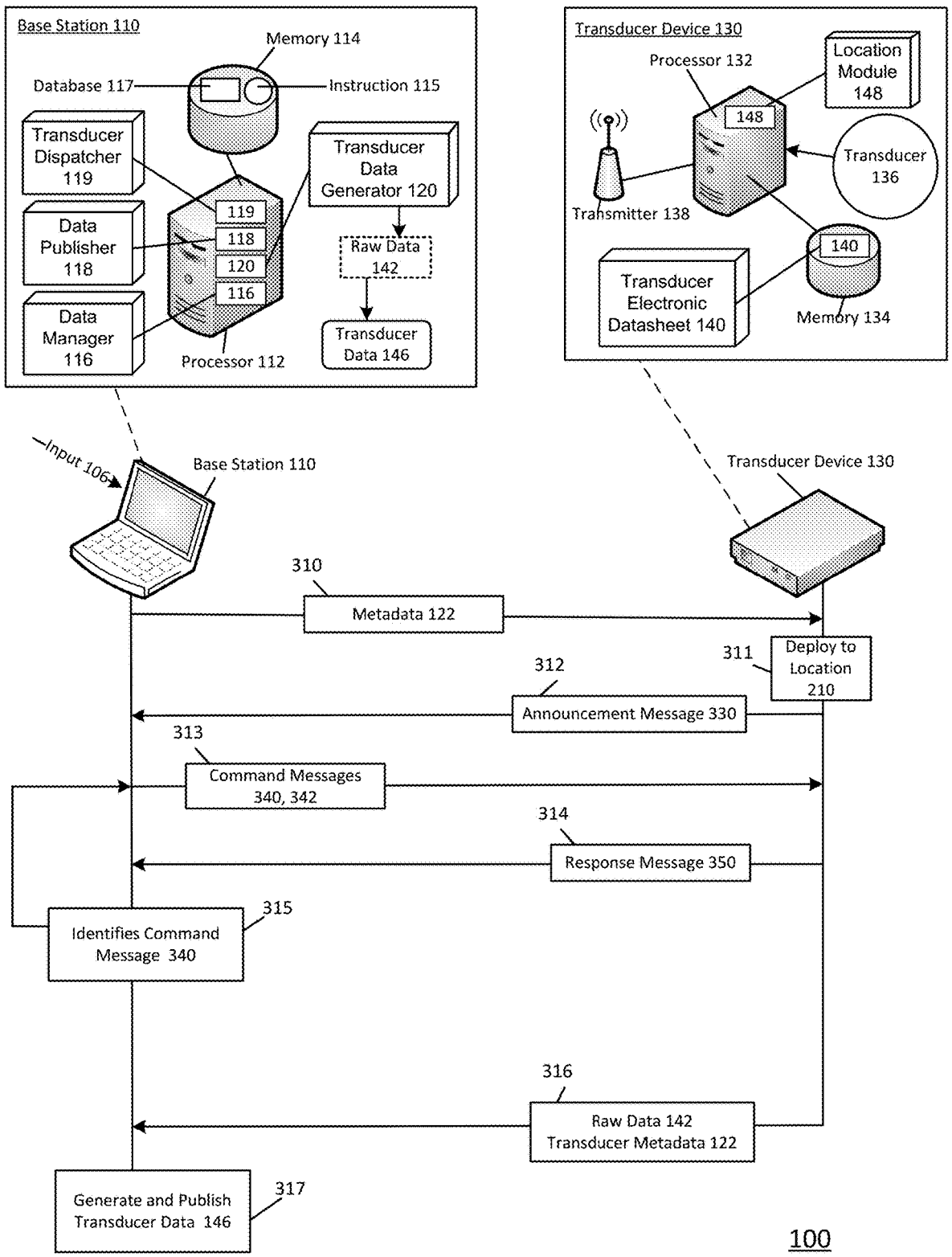
FIG. 3 illustrates the example system of FIG. 1 with additional detail relating to authentication of a transducer device.

FIG. 3 illustrates example system 100 of FIG. 1 with additional detail relating to authentication of a transducer device, arranged in accordance with at least some embodiments described herein. FIG. 3 is substantially similar to system 100 of FIGS. 1-2, with additional details. Those components in FIG. 3 that are labeled identically to components of FIGS. 1-2 will not be described again for the purposes of clarity.

In an example shown in FIG. 3, an implementation of system 100 may include an authentication process being performed by transducer dispatcher 119 and/or transducer devices 130, 131, 150. In the example, the implementation of system 100 may include operations 310, 311, 312, 313, 314, 315, 316, and/or 317. At operation 310, focusing on transducer device 130 as an illustrative example, transducer dispatcher 119 may send transducer metadata 122 to transducer device 130. As mentioned above, transducer device 130 may store transducer metadata.

Implementation of system 100 may continue from operation 310 to operation 311. At operation 311, transducer device 130 may be deployed to a location specified by a user of base station 110, such as location 210.

Implementation of system 100 may continue from operation 311 to operation 312. At operation 312, upon the deployment of transducer device 130, transducer device 130 may generate an announcement message 330 and may send announcement message 330 to transducer dispatcher 119. In some examples, announcement message 330 may be a message effective to indicate that transducer device 130 has been deployed to location 210. In some examples, announcement message 330 may be a message effective to indicate that transducer device 130 is ready to perform an authentication process with transducer dispatcher 119. In some examples, announcement message 330 may be a message effective to indicate that transducer device 130 is ready to receive commands in order to generate transducer raw data 142. In some examples, announcement message 330 may include an identifier of transducer device 130.

Implementation of system 100 may continue from operation 312 to operation 313. At operation 313, transducer dispatcher 119 may receive announcement message 330 from transducer device 130 and, in response, may identify transducer device 130 based on the identifier included in announcement message 330. Transducer dispatcher 119 may compare the identifier included in announcement message 330 with an identifier of transducer device 130 in database 113 to determine whether announcement message 330 is transmitted from a transducer device identified by base station 110 to fulfill input 106. In some examples, transducer dispatcher 119 may analyze announcement message 330 to determine a network status of transducer device 130. Base station 110 may determine if transducer device 130 is already registered with network 102, out of network 102, or a candidate to join network 102. If transducer device 130 is already registered with network 102, data manager 116 may begin to receive transducer raw data 142 from transducer device 103. If transducer device 130 is out of network 201, transducer dispatcher 119 may set the network status of transducer device 130 to a candidate to join network 102. In response to setting transducer device 130 to a candidate to join network 102, data manager 116 may generate one or more command messages 340, 342 and may send the one or more command messages 340, 342 to transducer device 130. In some examples, command messages 340, 342 may be messages effective to command transducer device 130 to start collecting measurements and generating transducer raw data 142.

In some examples, data manager 116 may send command messages 340, 324 to transducer device synchronously or asynchronously. In some examples, data manager 116 may encode command messages 340, 342 prior to sending command messages 340, 342 to transducer device 130.

Implementation of system 100 may continue from operation 313 to operation 314. At operation 314, transducer device 130 may receive command messages 340, 342 and, in response, may generate one or more response messages, including a response message 350. In some examples, transducer device 130 may wait for a time period to lapse, and if the time period has lapsed without receipt of any command messages from data manager 116, transducer device 130 may resend announce message 330 to transducer dispatcher 119. In some examples, transducer device 130 may determine whether command messages 340, 342 require a response. For example, if command message 340 includes a command indicating transducer device 130 may start to collect measurements, transducer device 130 may being to collect measurements without generating response message to command message 340. In another example, if command message 340 includes a command for transducer device 130 to send information, such as a network ping, transducer device 130 may generate response message 350 to respond to command message 340. In some examples, transducer device 130 may decode command messages 340, 342. In some examples, response message 350 may be a response to either one of, or both of, command messages 340, 342. Transducer device 130 may send response message 350 to transducer dispatcher 119. In some examples, transducer device 130 may encode response message 350 prior to sending response message 350 to transducer dispatcher 119.

Implementation of system 100 may continue from operation 314 to operation 315. At operation 315, data manager 116 may receive response message 350 and, in response, may identify one or more command messages based on response message 350. For example, data manager 116 may determine that response message 350 is a response to command message 340 based on the commands included in command message 340. Data manager 116 may store response message 350 in memory 114. In some examples, data manager 116 may analyze response message 350 in order to determine whether response message 350 may be necessary for data manager 116 of base station 110 to generate a new command message 340.

In some examples, data manager 116 may determine that response message 350 is a part of a response to command message 340. For example, a response to command message 340 may be of a particular size, such as "4096 bytes". Transducer device 130 may determine that the particular size may be greater than a bandwidth of a communication link between data manager 116 and transducer device 130. Transducer device 130 may generate response message 350 to be "2048 bytes", and may send response message 350 to data manager 116. In response to receiving response message 350, data manager 116 may identify that a response to command message 340 should be "4096 bytes" and may determine that response message 350 is "2048 bytes". Data manager 116 may determine that the response to command message 340 is not complete, and may wait for additional packets to from transducer device 130. In some examples, data manager 116 may repeat operation 313 to send additional command messages in order to command transducer device 130 to send the additional packets. Data manager 116 may determine that packets of the response to command message 340 are received and, in response, may assemble the received packets to generate response message 350. In response to receipt of response message 350, data manager 116 may register transducer device 130 with network 102 in order to communicate with transducer device 130 through network 102. In some examples, transducer dispatcher 119 may send subsequent command message to transducer device 130 to notify transducer device 130 of the registration with network 102.

Implementation of system 100 may continue from operation 315 to operation 316. At operation 316, upon a registration of transducer device 130 with network 102, transducer device 130 may begin to control transducer 136 to collect measurements as indicated by input 106. Transducer device 130 may generate transducer raw data 142 as described above, and may send transducer raw data 142 to data manager 116. In some examples, transducer device 130 may encode transducer raw data 142 prior to sending transducer raw data 142 to data manager 116. Transducer device 130 may further send transducer metadata 122 to data manager 116.

Implementation of system 100 may continue from operation 316 to operation 317. At operation 317, data manager 116 may receive transducer raw data 142 and transducer metadata 122 and, in response, may transform transducer raw data 142 into transducer data 146 based on transducer metadata 122. Data publisher 118 may further publish transducer data 146 through network 102. Data publisher 118 may be configured to publish transducer data 146, such as by uploading transducer data 146 to network 102 in order for devices connected to network 102 to retrieve transducer data 146. A user of any device connected to network 102 can input a request to retrieve transducer data 146 online or offline through a GUI that supports data analytics. Data analytics include a variety of graphs (bar chart, pies, etc.) allowing visualization of transducer data stored in the database 113. Data publisher 118, data manager 116, transducer data generator 120 or any combination of these components can fulfill the request.

Transducer data can be integrated seamlessly with transducer data collected by other devices/sources that adopt controlled vocabularies because metadata is based on those controlled vocabularies. Controlled vocabularies may include uniform descriptive terms that have been collectively agreed upon by the research community. Otherwise, if the transducer data does not conform to controlled vocabularies, the description of the nonconforming transducer data may be made uniform by matching corresponding terms in a dictionary. For example, if a temperature sensor measuring air temperature is described as "Temperature, Air" and the uniform description is "Air Temperature" then the two descriptions will be equated in this system and the transducer data will be integrated.

A system in accordance with the present disclosure may benefit a sensor network where multiple sensors are deployed to measure same or different attributes of an environment. The system may allow a user of the sensor network to monitor the environment while minimizing a need to program the sensor network based on individual sensors. For example, the system may allow the user to define attributes to be measured at a particular format prior to a deployment of the sensors without programming each sensor individually. As measurements are collected by the deployed sensors, the system may convert the measurements to the desired format indicated by the user. By minimizing a need to program sensors individually, users of the sensor network may require minimal training in programming.

Figure 4:
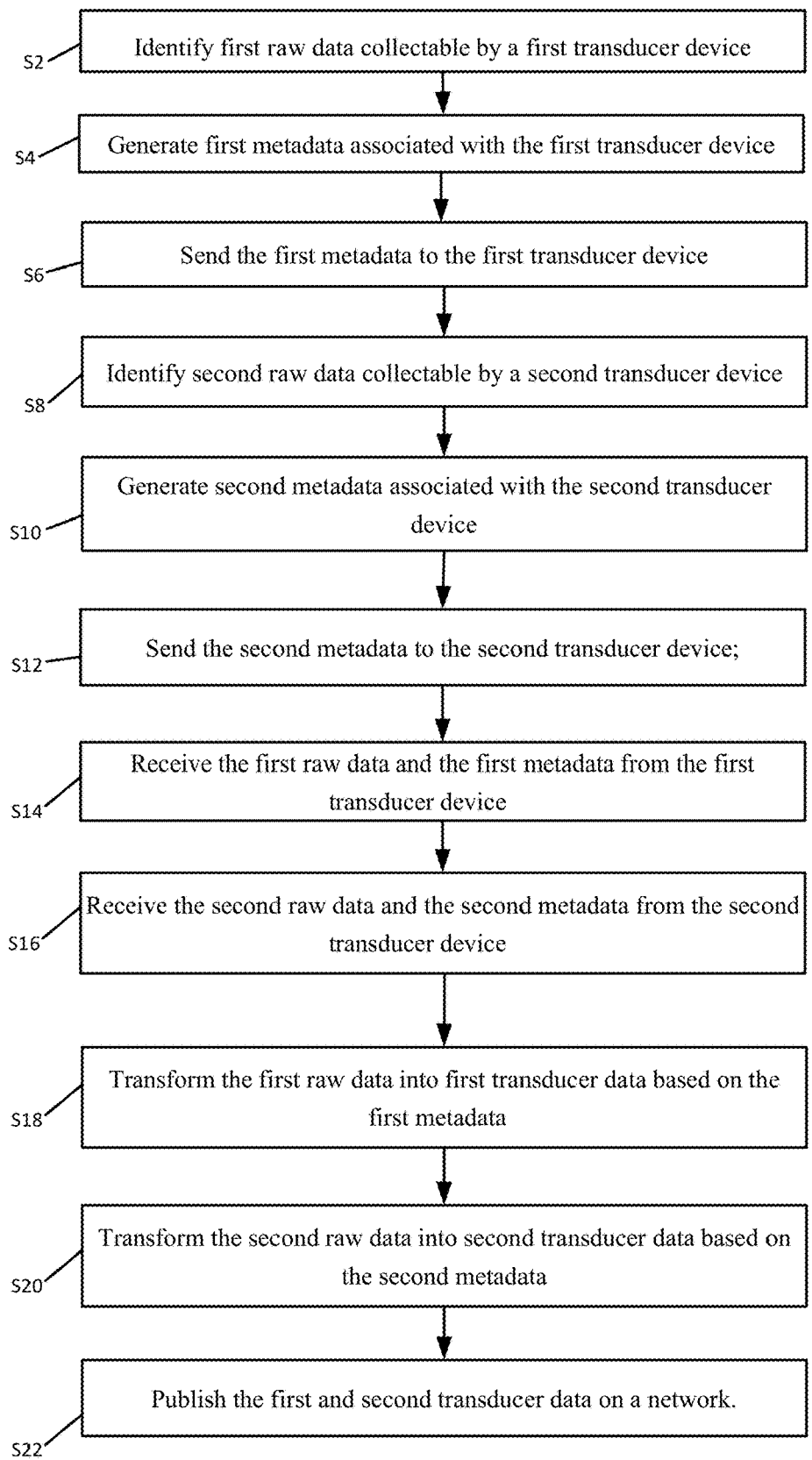
FIG. 4 illustrates a flow diagram for an example process to implement a transducer data generator, all arranged according to at least some embodiments described herein.

FIG. 4 illustrates a flow diagram for an example process to implement a transducer data generator, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14, S16, S18, S20 and/or S22. Although illustrated as discrete blocks, various blocks may be divided into additional blocks, combined into fewer blocks, or eliminated, depending on the desired implementation.

Processing may begin at block S2, where first raw data collectable by a first transducer device may be identified. Processing may continue from block S2 to block S4, where a base station may generate first metadata associated with the first transducer device. Processing may continue from block S4 to block S6, where the base station may send first metadata to the first transducer device. Processing may continue from block S6 to block S8, where the system may identify second raw data collectable by a second transducer device.

Processing may continue from block S8 to block S10, where the base station may generate second metadata associated with the second transducer device. Processing may continue from block S10 to block S12, where the base station may send the second metadata to the second transducer device. Processing may continue from block S12 to block S14, where the base station may receive the first raw data and the first metadata from the first transducer device. Processing may continue from block S14 to block S16, where the base station may receive the second raw data and the second metadata from the second transducer device. Processing may continue from block S16 to block S18, where the base station may transform the first raw data into first transducer data based on the first metadata. Processing may continue from block S18 to block S20, where the base station may transform the second raw data into second transducer data based on the second metadata. Processing may continue from block S20 to block S22, where the system may publish the second transducer data on a network.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a report relating to transducer data, the method comprising:
    identifying first raw data collectable by a first transducer device;
    generating, by a base station, first metadata associated with the first transducer device, wherein the first metadata corresponds to the first raw data, and the first metadata is effective to indicate a first format of a first parameter of the first raw data, wherein the first format includes a first unit of measure for the first parameter;
    sending, by the base station, the first metadata to the first transducer device;
    identifying second raw data collectable by a second transducer device;

generating, by the base station, second metadata associated with the second transducer device, wherein the second metadata corresponds to the second raw data, and the second metadata is effective to indicate a second format of a second parameter of the second raw data, wherein the second format includes a second unit of measure for the second parameter;

sending, by the base station, the second metadata to the second transducer device;

receiving, by the base station, the first raw data and the first metadata from the first transducer device, wherein the first raw data corresponds to the first format;

receiving, by the base station, the second raw data and the second metadata from the second transducer device, wherein the second raw data corresponds to the second format;

in response to receiving the first raw data and the first metadata, transforming, by the base station, the first raw data into first transducer data based on the first metadata, wherein the first transducer data includes to the first parameter of the first raw data in the first format;

in response to receiving the second raw data and the second metadata, transforming, by the base station, the second raw data into second transducer data based on the second metadata, wherein the second transducer data includes to the second parameter of the second raw data in the second format; and publishing the first and second transducer data on a network.

2. The method of claim 1, wherein:
the first and second formats are the same;
the first and second units of measure are the same; and
the first and second parameters are the same.

3. The method of claim 1, further comprising, prior to receiving the first raw data;

receiving, by the base station, an announcement message from the first transducer device, wherein the announcement message is effective to indicate that the first transducer device is ready to receive commands associated with the first raw data;

in response to receiving the announcement message, sending, by the base station, a command message to the first transducer device, wherein the command message includes a command for the first transducer device to generate the first raw data.

4. The method of claim 3, wherein the announcement message is a first announcement message, the command message is a first command message, and the command is a first command, the method further comprises:

in response to receiving the first announcement message, sending, by the base station, a second command message to the first transducer device, wherein the second command message includes a second command for the first transducer device to generate the first raw data;

receiving, by the base station, a response message from the first transducer device; and determining, by the base station, that the response message is a response to the first command.

5. The method of claim 1, further comprising, prior to receiving the first and second raw data:

receiving, by the base station, an announcement message from the first transducer device, wherein the announcement message is effective to indicate that the first transducer device is ready to receive commands associated with the first raw data;

in response to receiving the announcement message, sending, by the base station, a command message to the first transducer device, wherein the command message includes a command for the first transducer device to generate the first raw data;

receiving, by the base station, a first part of a response message from the first transducer device, wherein the response message is a response to the command message;

decoding, by the base station, the first part of the response message;

receiving, by the base station, a second part of the response message from the first transducer device;

decoding, by the base station, the second part of the response message; and generating, by the base station, the response message based on the first and second parts of the response message.

6. The method of claim 1, wherein:
transforming the first raw data includes annotating the first raw data with the first metadata; and
transforming the second raw data includes annotating the second raw data with the second metadata.

7. The method of claim 1, wherein publishing the first and second transducer data on the network includes making the first and second transducer data available through a graphical user interface or an application programming interface.

8. A method for measuring transducer data, the method comprising:

sending, by a first transducer device to a base station a first identification of first raw data collectable by a first transducer device;

receiving, by the first transducer device from the base station, first metadata associated with the first transducer device, wherein the first metadata corresponds to the first raw data, and the first metadata is effective to indicate a first format of a first parameter of the first raw data, wherein the first format includes a first unit of measure for the first parameter;

sending, by a second transducer device to the base station a second identification of second raw data collectable by a second transducer device;

receiving, by the second transducer device from the base station, second metadata associated with the second transducer device, wherein the second metadata corresponds to the second raw data, and the second metadata is effective to indicate a second format of a second parameter of the second raw data, wherein the second format includes a second unit of measure for the second parameter;

sending, from the first transducer device to the base station, the first raw data and the first metadata, wherein the first raw data corresponds to the first format;

sending, by the second transducer device to the base station, the second raw data and the second metadata, wherein the second raw data corresponds to the second format;

in response to receiving the first raw data and the first metadata, transforming, by the base station, the first raw data into first transducer data based on the first metadata, wherein the first transducer data includes to the first parameter of the first raw data in the first format;

in response to receiving the second raw data and the second metadata, transforming, by the base station, the second raw data into second transducer data based on the second metadata, wherein the second transducer data includes to the second parameter of the second raw data in the second format; and publishing the first and second transducer data on a network.

9. The method of claim 8, wherein:
the first and second formats are the same;
the first and second units of measure are the same; and
the first and second parameters are the same.

10. The method of claim 8, further comprising, prior to sending the first raw data;
receiving, by the base station, an announcement message from the first transducer device, wherein the announcement message is effective to indicate that the first transducer device is ready to receive commands associated with the first raw data; and
in response to receiving the announcement message, sending, by the base station, a command message to the first transducer device, wherein the command message includes a command for the first transducer device to generate the first raw data.

11. The method of claim 10, wherein the announcement message is a first announcement message, the command message is a first command message, and the command is a first command, the method further comprising:
in response to receiving the first announcement message, sending, by the base station, a second command message to the first transducer device, wherein the second command message includes a second command for the first transducer device to generate the first raw data;
receiving, by the base station, a response message from the first transducer device; and
determining, by the base station, that the response message is a response to the first command.

12. The method of claim 8, further comprising, prior to receiving the first and second raw data:
receiving, by the base station, an announcement message from the first transducer device, wherein the announcement message is effective to indicate that the first transducer device is ready to receive commands associated with the first raw data;
in response to receiving the announcement message, sending, by the base station, a command message to the first transducer device, wherein the command message includes a command for the first transducer device to generate the first raw data;
receiving, by the base station, a first part of a response message from the first transducer device, wherein the response message is a response to the command message;
decoding, by the base station, the first part of the response message;
receiving, by the base station, a second part of the response message from the first transducer device;
decoding, by the base station, the second part of the response message; and
generating, by the base station, the response message based on the first and second parts of the response message.

13. The method of claim 8, wherein:
transforming the first raw data includes annotating the first raw data with the first metadata; and
transforming the second raw data includes annotating the second raw data with the second metadata.

14. The method of claim 8, wherein publishing the first and second transducer data on the network includes making the first and second transducer data available through a graphical user interface or an application programing interface.

15. A device effective to generate a report relating to transducer data, the device comprising:
a transceiver;
a memory; and
a processor effective to be in communication with the transceiver and the memory;
wherein the processor is effective to:
identify first raw data collectable by a first transducer device;
store a first association of the first raw data and the first transducer device in the memory;
generate first metadata associated with the first transducer device, wherein the first metadata corresponds to the first raw data, and the first metadata is effective to indicate a first format of a first parameter of the first raw data, wherein the first format includes a first unit of measure for the first parameter;
send, through the transceiver, the first metadata to the first transducer device;
identify second raw data collectable by a second transducer device;
store a second association of the second raw data and the second transducer device in the memory;
generate second metadata associated with the second transducer device, wherein the second metadata corresponds to the second raw data, and the second metadata is effective to indicate a second format of a second parameter of the second raw data, wherein the second format includes a second unit of measure for the second parameter;
send, through the transceiver, the second metadata to the second transducer device;
the transceiver further effective to:
receive the first raw data and the first metadata from the first transducer device, wherein the first raw data corresponds to the first format;
receive the second raw data and the second metadata from the second transducer device, wherein the second raw data corresponds to the second format;
and wherein the processor is further effective to:
in response to receipt of the first raw data and the first metadata, transform the first raw data into first transducer data based on the first metadata, wherein the first transducer data includes the first parameter of the first raw data in the first format;
in response to receipt of the second raw data and the second metadata, transform the second raw data into second transducer data based on the second metadata, wherein the second transducer data includes the second parameter of the second raw data in the second format; and
publish the first and second transducer data on a network.

16. The device of claim 15, wherein:
the first and second formats are the same;
the first and second units of measure are the same; and
the first and second parameters are the same.

17. The device of claim 15, further comprising, prior to receipt of the first raw data:
the transceiver is further effective to receive an announcement message from the first transducer device, wherein the announcement message is effective to indicate that the first transducer device is ready to receive commands associated with the first raw data; and the processor is further effective to send, in response to receipt of the announcement message, a command message to the first transducer device, wherein the command message includes a command for the first transducer device to generate the first raw data.

18. The device of claim 17, wherein the announcement message is a first announcement message, the command message is a first command message, and the command is a first command, and wherein:
in response to receipt of the first announcement message, the processor is further effective to send a second command message to the first transducer device, wherein the second command message includes a second command for the first transducer device to generate the first raw data;
the transceiver is effective to receive a response message from the first transducer device; and
the processor is effective to determine that the response message is a response to the first command based on the response message.

19. The device of claim 15, wherein, prior to receipt of the first and second raw data, the processor is effective to:
receive an announcement message from the first transducer device, wherein the announcement message is effective to indicate that the first transducer device is ready to receive commands associated with the first raw data;
in response to receipt of the announcement message, send a command message to the first transducer device, wherein the command message includes a command for the first transducer device to generate the first raw data;
receive a first part of a response message from the first transducer device, wherein the response message is a response to the command message;
decode the first part of the response message;
receive a second part of the response message from the first transducer device;
decode the second part of the response message; and
generate the response message based on the first and second parts of the response message.

20. The device of claim 15, wherein:
transformation of the first raw data includes annotation of the first raw data with the first metadata; and
transformation of the second raw data includes annotation of the second raw data with the second metadata.

* * * * *